US012756475B2

(12) United States Patent
Maram et al.

(10) Patent No.: US 12,756,475 B2
(45) Date of Patent: Oct. 6, 2026

(54) INDEPENDENT CHANNEL CONTROL IN COHERENT OPTICS

(71) Applicant: Juniper Networks, Inc., Sunnyvale, CA (US)

(72) Inventors: Raghavasandeep Maram, Bangalore (IN); Tapan Kumar Chauhan, Bangalore (IN); B.V. Srinivasamurthy, Bangalore (IN); Shanmuga Priya Marimuthu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 206 days.

(21) Appl. No.: 18/662,030

(22) Filed: May 13, 2024

(65) Prior Publication Data

US 2025/0350364 A1 Nov. 13, 2025

(51) Int. Cl.
*H04B 10/50* (2013.01)
*H04B 10/516* (2013.01)
*H04B 10/572* (2013.01)

(52) U.S. Cl.
CPC ......... *H04B 10/504* (2013.01); *H04B 10/516* (2013.01); *H04B 10/572* (2013.01)

(58) Field of Classification Search
CPC ... H04B 10/504; H04B 10/516; H04B 10/572
See application file for complete search history.

(56) References Cited

U.S. PATENT DOCUMENTS 8,199,637 B2 * 6/2012 Bruckman .......... H04L 12/4641 370/225
8,437,262 B2 * 5/2013 Kotrla ..................... H04L 12/14 370/242
9,001,846 B2 * 4/2015 Lin ......................... H04L 9/004 709/250

(Continued)

FOREIGN PATENT DOCUMENTS

WO WO-2017134419 A1 * 8/2017 ............. H04L 69/14

OTHER PUBLICATIONS

Common Management Interface Specification (CMIS) Revision 5.2 (Year: 2022).*

(Continued)

*Primary Examiner* — David C Payne
*Assistant Examiner* — Mohammed Abdelraheem
(74) *Attorney, Agent, or Firm* — Harrity & Harrity, LLP

(57) ABSTRACT

An optical communication device includes a first data interface providing a first channel and one or more additional data interfaces providing one or more additional channels. A multiplexer generates a multiplexed signal encoding the first channel and the one or more additional channels. An optical transmitter transmits the multiplexed signal over an optical link to a remote device. A controller receives a disable signal identifying the first channel, and in response to receiving the disable signal, causes the optical transmitter to transmit a remote fault signal to the remote device on the first channel of the multiplexed signal, disables the first channel, causes the multiplexer to generate a modified multiplexed signal (Continued)

encoding the one or more additional channels and not the first channel, and causes the optical transmitter to transmit the modified multiplexed signal to the remote device over the optical link.

20 Claims, 3 Drawing Sheets

(56) References Cited

U.S. PATENT DOCUMENTS

| | | | | |
|---|---|---|---|---|
| 9,544,050 | B2 * | 1/2017 | Cavaliere | H04J 14/025 |
| 10,419,116 | B2 * | 9/2019 | Coli | H04J 14/0227 |
| 2009/0269069 | A1 * | 10/2009 | Mahgerefteh | H04B 10/54 398/183 |
| 2010/0202777 | A1 * | 8/2010 | Liu | H04J 14/0204 398/83 |
| 2015/0043907 | A1 * | 2/2015 | Cavaliere | H04B 10/0775 398/30 |
| 2020/0059712 | A1 * | 2/2020 | Satyarthi | H04J 14/0212 |

OTHER PUBLICATIONS

1G/10G/25G Switching Ethernet Subsystem v2.6 (Year: 2021).*
OIF-400ZR-02.0 Implementation Agreement 400ZR (Year: 2022).*
ITU-T G.709/Y.1331 (Year: 2020).*
"1G 10G 25G Switching Ethernet Subsystem Product Guide PG292", [Online]. Retrieved from the Internet: <https://docs.amd.com/r/en-US/pg292-ethernet-1-10-25g/Introduction>, (2024), 193 pgs.
"Clause 37 Auto Negotiation", [Online]. Retrieved from the Internet: <https://www.iol.unh.edu/sites/default/files/knowledgebase/ge/Clause_37_Auto-Negotiation.pdf>, 64 pgs.
Zhang, Bo, "Consideration of a Baseline Spec for 400GBASE ZR SD and SF Signaling", [Online]. Retrieved from the Internet: <https://www.ieee802.org/3/ct/public/tf_interim/20_1008/zhang_3cw_01_201008.pdf>, (Oct. 8, 2020), 10 pgs.

* cited by examiner

INDEPENDENT CHANNEL CONTROL IN COHERENT OPTICS

TECHNICAL FIELD

The present disclosure generally relates to optical transmitters and more particularly to default transmit power behavior for optical transceivers.

BACKGROUND

In the realm of optical communications, coherent optics technology is commonly used for high-capacity data transmission. This technology leverages modulation of the amplitude, phase, and polarization of light to encode information, allowing for the transmission of data at rates of 100 gigabits per second and beyond. Standards such as 400GBASE-ZR and OpenZR+ define the requirements and specifications for interoperable 400 Gbps optical devices. These standards are sometimes referred to as just 400ZR and 400ZR+, or variants like 400G-ZR and 400G-ZR+. 400ZR and 400ZR+ transceivers utilize 8 parallel lanes of PAM4 modulation to achieve aggregate data rates up to 400 Gbps on a single wavelength. However, higher or lower data rates are used by some coherent optics technologies, such as 100 Gbps or 800 Gbps.

Coherent optics are commonly employed in various applications, including long-haul transmissions, metro networks, and data center interconnects, due to their ability to efficiently utilize bandwidth and manage complex modulation schemes.

BRIEF DESCRIPTION OF THE SEVERAL VIEWS OF THE DRAWINGS

The following description includes discussion of figures having illustrations given by way of example of implementations of embodiments of the disclosure. The drawings should be understood by way of example, and not by way of limitation. As used herein, references to one or more "examples" or "embodiments" are to be understood as describing a particular feature, structure, or characteristic included in at least one implementation of the inventive subject matter, in at least some circumstances. Thus, phrases such as "in one example", "in some examples", "in some embodiments", "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number may refer to the figure ("FIG.") number in which that element or act is first introduced.

Figure 1:
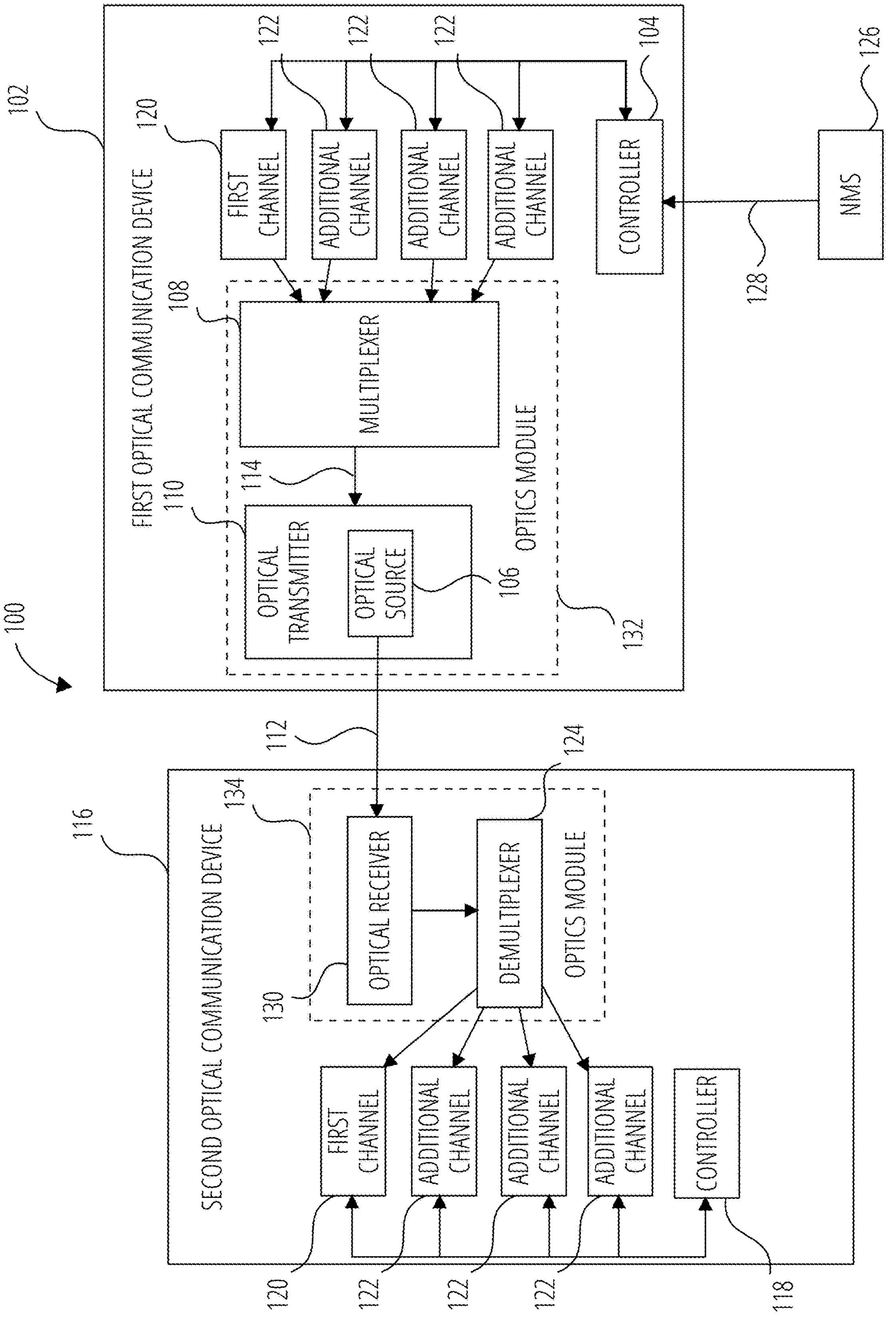
FIG. 1 illustrates a block diagram of an optical communication system, in accordance with at least one example.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

Multiplexing techniques are used by coherent optical devices to increase the amount of data that can be transmitted over a single optical fiber, such as data from multiple clients. These techniques include wavelength division multiplexing (WDM) and its derivatives, which enable multiple data channels to share the same fiber by operating at the same wavelength. The management of these channels is important to network reliability and efficiency, as it involves the dynamic enabling and disabling of channels to perform maintenance, manage network resources, or respond to network conditions without disrupting the entire communication system.

However, in some cases, the default behavior of coherent optical devices in managing multiple multiplexed data channels may give rise to undesired effects. For example, in the default operational behavior of some coherent optics systems, when a data channel is disabled (often referred to as the channel being in an "admin down" state) the shared laser source associated with that channel is typically turned off. This action may be the result of a software command such as "set interface et-< > disable", or another command to administratively disable a channel in a muxponder mode of the device, being executed in the system software managing the coherent optical device. As a consequence of disabling the laser, all channels that are multiplexed and share the same laser source and wavelength are inadvertently affected, leading to a complete shutdown of traffic across those channels. Typically, the remote device at the receiving end of the communication link will detect that it has stopped receiving the laser, and will eventually determine that the link has been terminated, e.g., based on a timeout counter. The remote device will categorize this event a "local fault" condition, thereby closing each data channel that was using the optical link (e.g., the same optical medium, such as a fiber optic cable). Each terminated channel will also result in a "remote fault" signal being asserted across the optical link to the local device where the laser has been disabled. The local device will receive the "remote fault" signals and, in response, terminate each data channel using the optical link.

This can result in significant network disruptions, especially in systems where multiple data channels are tightly integrated and rely on a single optical source for their operation. Thus, the inability to selectively disable a single channel without impacting the others is a notable limitation in such systems. Furthermore, disabling a laser carrying multiple data channels results in a complex sequence of signals being sent back and forth between the local and remote devices, further complicating and extending the process and introducing further data traffic into the optical link, thereby potentially increasing communication overhead and latency.

Examples described herein attempt to address one or more of these limitations of coherent optical devices by providing techniques for independent channel control in coherent optics systems. Some examples may attempt to address one or more technical problems related to optical communications, such as the inability to selectively and independently disable individual data channels being carried on the same optical source, and/or the unnecessary communication overhead and latency introduced by locally disabling a local optical source, thereby requiring the remote device to time out, disable multiple channels, and transmit remove fault signals for each disabled channel.

Some protocols have been proposed to handle independent control of individual data channels in coherent optics systems. For example, version 5.2 of the CMIS (Common Management Interface Specification) standard provides a specification for management interfaces of pluggable optical modules, and may enable some multiplexed optical channels transmitted between CMIS 5.2-compliant optical devices to be selectively disabled. However, these protocols require that both the local device (where the transmitting laser or other optical source is located) and the remote device (receiving the optical signal) implement the protocol or standard. Many devices currently deployed in optical networks do not implement these protocols; thus, for an optical network to benefit from these techniques, all devices on the network must be modified to implement them.

In contrast, examples described herein can be used to selectively and independently control individual data channels encoded in multiplexed signals received by a wide array of remote devices, including currently-deployed conventional optical devices. By leveraging existing standards, protocols, and behaviors of optical devices currently on the market and deployed in optical networks, independent and efficient data channel control can be implemented using examples described herein, without requiring existing network equipment to be modified or replaced. Techniques described herein can potentially be applied to a wide range of devices within the field of optical communications, including those that utilize coherent optics such as routers, switches, transponders, and optical line systems. These devices are often used in infrastructure that manages data transmission over long distances and between data centers, leveraging the advanced capabilities of coherent optics to maximize bandwidth and signal integrity. Additionally, some examples described herein are also applicable to normal optical devices, such as various forms of optical networking equipment.

FIG. 1 shows a block diagram of an optical communication system 100. The optical communication system 100 includes a first optical communication device 102 and a second optical communication device 116 communicating with each other over an optical link 112. The first optical communication device 102 may also be referred to herein as the local device or the transmitting device. The second optical communication device 116 may also be referred to herein as the remote device or the receiving device.

In some examples, a network management system (shown as NMS 126) may be included in the optical communication system 100 to provide a management interface for a network administrator. An NMS is a set of software tools that enable an IT professional to monitor, control, and manage the entire lifecycle of a network infrastructure. An NMS can be used to manage both hardware (such as switches, routers, servers, and other network devices) and software (such as applications, services, and operating systems) components of the network. The NMS 126 can be used to manage at least the first optical communication device 102, for example, by communicating with the first optical communication device 102 over a communication link or network.

The first optical communication device 102 includes a controller 104, a first channel 120 provided by a first data interface, one or more additional channels 122 provided by one or more respective additional data interfaces, and an optics module 132. The optics module 132 includes a multiplexer 108 and an optical transmitter 110. The optical transmitter 110 includes an optical source 106. The controller 104 and data interfaces can be considered part of the system hardware and/or software of the first optical communication device 102, as distinct from the optics module 132. For example, each data interface can be implemented in the first optical communication device 102 by medium access control (MAC) hardware, electrical signal multiplexing hardware (such as a probabilistic constellation shaping (PCS) module), and a 100 Gbit/second 2-lane electrical interface such as a 100GAUI-2 interface. The optics module 132 is configured to communicate with the 100GAUI-2 interfaces of the various data interfaces of the system. Each data channel is therefore associated with the MAC of its data interface at the first optical communication device 102. (As used herein, MAC refers to the components (hardware and/or software) used to implement the MAC layer functionality of a given data interface.)

The second optical communication device 116 also includes an optics module 134 and a controller 118, as well as a first data interface receiving the first channel 120 and one or more additional data interfaces receiving the one or more additional channels 122. The optics module 134 includes an optical receiver 130 and a demultiplexer 124. As in the first optical communication device 102, the controller 118 and data interfaces can be considered part of the system hardware and/or software of the second optical communication device 116, as distinct from the optics module 134. As in the first optical communication device 102, each data interface can be implemented in the second optical communication device 116 by medium access control (MAC) hardware, electrical signal multiplexing hardware (such as a probabilistic constellation shaping (PCS) module), and a 100GAUI-2 interface. The optics module 134 is configured to communicate with the 100GAUI-2 interfaces of the various data interfaces of the system. Each data channel is therefore associated with the MAC of its data interface at the second optical communication device 116.

The optical link 112 can be a single optical medium, such as a fiber optic cable, configured to carry an optical signal transmitted by the optical source 106 to be received by the second optical communication device 116.

It will be appreciated that the first channel 120 may be any data channel processed by the optics module 132 or optics module 134, and is not intended to be limited to a specific channel of a multi-channel system. Thus, the techniques described herein are equally applicable to any of the additional channels 122 as well as the first channel 120. The first channel 120 can be any arbitrarily selected channel of the system.

In operation, the first channel 120 and additional channels 122 are received by the multiplexer 108 of the optics module 132. The multiplexer 108 generates a multiplexed signal 114 encoding the first channel 120 and the one or more additional channels 122. The multiplexer 108 provides the multiplexed signal 114 to the optical transmitter 110, which uses the optical source 106 to transmit the multiplexed signal 114 as an optical signal over the optical link 112 to a remote device, in this case the second optical communication device 116.

In some examples, the multiplexer 108 is configured to support a 100G, 400G, or 800G coherent optics interface for transmitting the multiplexed signal 114 over the optical link 112. The multiplexed signal 114, when transmitted over the optical link 112 by the optical transmitter 110, may therefore be a 100G, 400G, or 800G optical multiplexed signal. The techniques described herein may be applied more generally to any ethernet client signal encapsulated or multiplexed within an optical container, including any future optical multiplexed communication specifications.

In some examples, the optical transmitter 110 is a coherent optical transmitter, and the optical source 106 is a coherent optical source, such as a tunable laser configured to adjust a wavelength of the multiplexed signal 114 when transmitting the multiplexed signal 114 over the optical link 112. In other examples, a regular (non-coherent) optical source may be used instead.

The second optical communication device 116 receives the optical signal from the optical link 112 at an optical receiver 130. The receiver provides the received signal to a demultiplexer 124. The demultiplexer 124 demultiplexes the multiplexed signal 114 into its constituent channels: the first channel 120 and the one or more additional channels 122.

The controller 104 of the first optical communication device 102 is configured to perform independent control of the data channels (e.g., first channel 120 and the one or more additional channels 122) without disabling the optical source 106. When one of the data channels needs to be disabled, the controller 104 is able to disable the single identified data channel without disabling the optical source 106, by asserting a remote fault over a dedicated data channel, thereby allowing the remaining channels being encoded on the multiplexed signal 114 to continue being transmitted over the optical link 112 without interruption.

Figure 2:
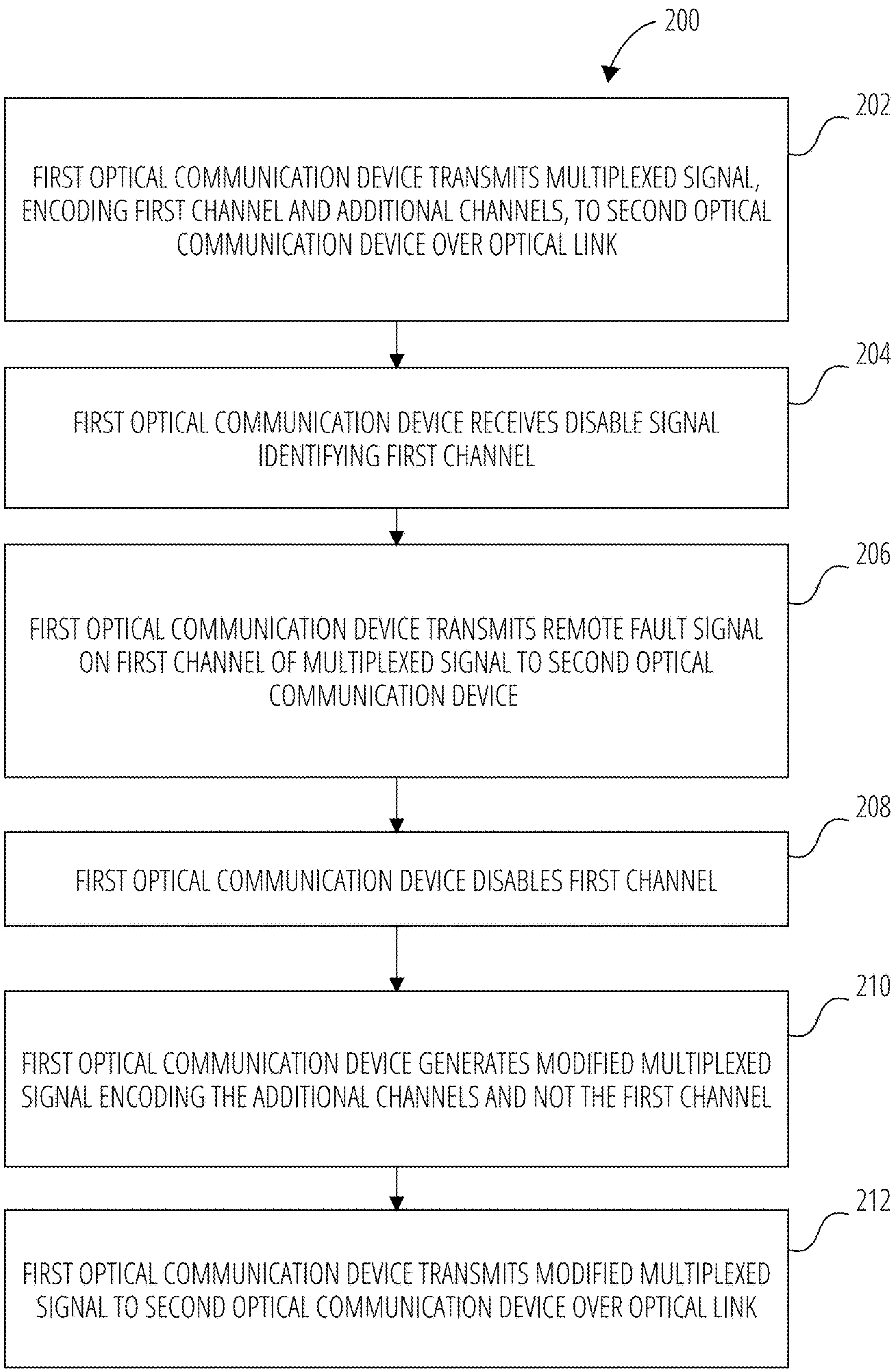
FIG. 2 illustrates a flowchart showing operations of an example method of independently controlling data channels of an optical multiplexed signal at a transmitting optical communication device, in accordance with at least one example.
Figure 3:
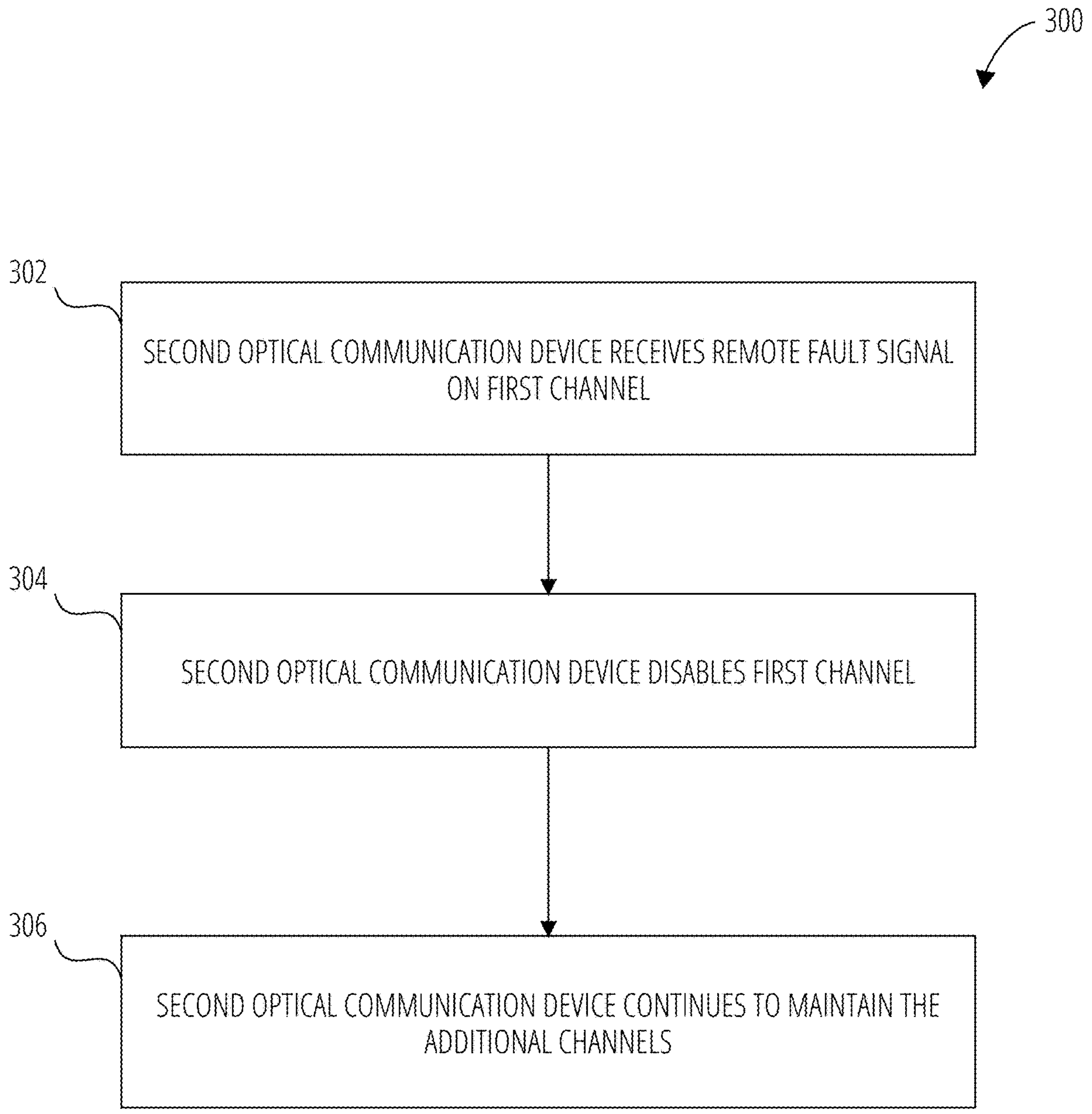
FIG. 3 illustrates a flowchart showing operations of an example method of independently controlling data channels of an optical multiplexed signal at a receiving optical communication device, in accordance with at least one example.

FIG. 2 shows operations of an example method for independent control of the data channels performed by the first optical communication device 102. FIG. 3 shows additional operations of a second method performed by the second optical communication device 116. It will be appreciated that the methods shown in FIG. 2 and FIG. 3 can form a single method performed by the optical communication system 100 in some cases.

FIG. 2 illustrates an example method 200 of independently controlling data channels of an optical multiplexed signal. Whereas the operations of method 200 are described as being performed by the optical communication system 100 of FIG. 1, and specifically by the first optical communication device 102, it will be appreciated that one or more of the operations of method 200 can be performed by other suitable devices and/or systems.

Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 includes the first optical communication device 102 transmitting the multiplexed signal 114, encoding the first channel 120 and one or more additional channels 122, to the second optical communication device 116 over the optical link 112 at operation 202.

According to some examples, the method 200 includes the first optical communication device 102 receiving a disable signal 128 identifying the first channel 120 at operation 204. The disable signal 128 is intended to assert that the identified channel (in this example, the first channel 120) needs to be disabled. In some examples, the disable signal 128 is transmitted to the first optical communication device 102 over a communication link or communication network (such as an ethernet network), for example, by the NMS 126. In some examples, the generation of the disable signal 128 is internal to the first optical communication device 102: for example, the disable signal 128 can be generated by a logical process executed by the controller 104.

In some examples, the disable signal 128 is generated in response to, or causes the generation of, a remote fault signal internal to the first optical communication device 102. For example, the disable signal 128 received by the controller 104 can be triggered by a system or host of the first optical communication device 102 detecting a local fault or remote fault notification in the data stream of the first channel 120 being received by the first optical communication device 102 from a source internal or external to the first optical communication device 102. In some examples, the disable signal 128 results in the generation of a local fault or remote fault notification being generated and inserted into the data stream of the first channel 120 at the first optical communication device 102, prior to the processing of the first channel 120 by the multiplexer 108. In some examples, the disable signal 128 is a local fault or remote fault signal present in the data stream of the first channel 120.

In response to receiving the disable signal 128, the subsequent operations 206 through 212 are performed.

According to some examples, the method 200 includes the optical transmitter 110 of the first optical communication device 102 transmitting a remote fault signal on the first channel 120 of the multiplexed signal 114, to the second optical communication device 116 at operation 206. A remote fault signal is a notification sent from one network device to another to indicate that a fault or error condition has been detected on the transmitting side of a link. The remote fault signal is used to inform the receiving device of the issue, allowing it to take appropriate action, such as disabling the affected link or rerouting traffic to maintain network integrity. In the context of optical communication, optical communication devices are configured to assert (e.g., transmit) and receive remote fault signals according to standardized formats and protocols.

In some examples, the controller 104 causes the first data interface to generate the remote fault signal. For example, the controller 104, in response to receiving the disable signal 128, can control the MAC hardware of the first data interface to generate and assert the remote fault signal. The remote fault signal is propagated to the optics module 132 (e.g., by being multiplexed by the PCS module and propagated to the optics module 132 via the 100GAUI-2 interface). The multiplexer 108 generates the multiplexed signal 114 to incorporate the remote fault signal. The optical transmitter 110 then transmits the multiplexed signal 114, incorporating the remote fault signal, over the optical link 112.

In some examples, the first data interface may not be configured to generate the remote fault signal on command. Thus, in some cases, the controller 104 may instead control the MAC hardware of the first data interface to simulate a local fault. The simulated local fault is processed by the MAC hardware to result in the generation of the remote fault signal, which is asserted and propagated as described above.

According to some examples, the method 200 includes the first optical communication device 102 disabling the first channel 120 at operation 208. Unlike existing optical multiplexing techniques, when the first channel 120 is disabled in operation 206, the optical source 106 continues to operate. The disable signal 128 is processed by the controller 104 to disable the first channel 120 without disabling the optical source 106, such that the optical source 106 is maintained in an active state after the first channel 120 is disabled. In some examples, the first channel 120 can be disabled by the controller 104 reconfiguring the data interfaces of the multiplexer 108 such that only the additional channel 122 are configured as inputs to the multiplexer 108.

By using existing standards and protocols for formatting and asserting the remote fault signal, compatibility with existing network devices can be improved or maximized. Thus, the remote fault signal can be configured to be processed a remote device (e.g., second optical communication device 116) without the remote device implementing the CMIS 5.2 standard. Instead, the remote device can respond as intended to the remote fault signal in accordance with one or more standards, specifications, protocols, or behaviors predating the CMIS 5.2 standard.

In some examples, asserting the remote fault signal at operation 208 can be performed before, or concurrently with, disabling the first channel 120 at operation 206.

According to some examples, the method 200 includes the multiplexer 108 of the first optical communication device 102 generating a modified multiplexed signal at operation 210. The modified multiplexed signal encodes the additional channels 122 but not the first channel 120. The controller 104 can reconfigured the inputs of the multiplexer 108 such that the multiplexer 108 continues to generate a multiplexed signal, but the signal is now modified relative to the original multiplexed signal 114 by the exclusion of the first channel 120.

According to some examples, the method 200 includes the optical transmitter 110 of the first optical communication device 102 transmitting the modified multiplexed signal to the second optical communication device 116 over the optical link 112 at operation 212. Because the second optical communication device 116 has been notified to disable the first channel 120 by the remote fault signal, the second optical communication device 116 should now be configured to receive and process the modified multiplexed signal, such that the demultiplexer 124 can decode the modified multiplexed signal to extract the additional channels 122.

In some examples, the method 200 can include additional operations not shown in the flowchart of FIG. 2. In some cases, if all of the additional channels 122 are disabled by the first optical communication device 102 according to the same operations used to disable the first channel 120, the first optical communication device 102 may respond by disabling the optical source 106 (e.g., the transmit laser) to conserve power. Thus, for example, if the controller 104 determines that all data channels (e.g., all additional channels 122) using the optical source 106 have been disabled, the controller 104 can control the optical transmitter 110 to disable the optical source 106.

Method 200 has been described with respect to operations performed by the first optical communication device 102. A complementary second method, performed by the second optical communication device 116, is described below with reference to FIG. 3.

FIG. 3 illustrates an example method 300 of independently controlling data channels of an optical multiplexed signal. Whereas the operations of method 300 are described as being performed by the optical communication system 100 of FIG. 1, and specifically by the second optical communication device 116, it will be appreciated that one or more of the operations of method 300 can be performed by other suitable devices and/or systems. As described above, in some cases method 300 can be combined with method 200 to form a single method performed by the optical communication system 100.

Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes the second optical communication device 116 receiving the remote fault signal at operation 302. As described above, the remote fault signal is received over the first channel 120 of the multiplexed signal 114. In some examples, as described above, the remote fault signal is carried on the first channel 120 of the multiplexed signal 114, which is demultiplexed by demultiplexer 124. The data of the first channel 120 decoded from the multiplexed signal 114 is forwarded to a first data interface of the second optical communication device 116 configured to receive the first channel 120. The system logic (e.g., controller 118) of the second optical communication device 116 then processes the remote fault signal received on the first channel 120. In some examples, this processing proceeds in accordance with existing protocols and standards (e.g., not the CMIS 5.2 standard).

According to some examples, the method 300 includes the second optical communication device 116 disabling the first channel 120 at operation 304. The controller 118 of the second optical communication device 116 identifies that the remote fault signal has been received over the first channel 120. The controller 118 can then disable the first channel 120, e.g., by reconfiguring the outputs of the demultiplexer 124 to include only the additional channels 122. The MAC of the first data interface of the second optical communication device 116, associated with the first channel 120, can be disabled, thereby bringing down the network interface used by the first channel 120.

According to some examples, the method 300 includes the second optical communication device 116 continuing to maintain the additional channels 122 at operation 306. The multiplexer 108, as reconfigured at operation 304, is now configured to decode only the additional channels 122 from the received optical signal (e.g., the modified multiplexed signal as described above).

As described above, the remote fault signal is configured by the first optical communication device 102 to be processed by the second optical communication device 116 without using the CMIS 5.2 standard. Thus, the second optical communication device 116 can be an optical communication device that does not implement the CMIS 5.2 standard. Instead, the second optical communication device 116 can process the remote fault signal in accordance with a standard, protocol, specification, or behavior predating the CMIS 5.2 standard. This means that the method 300 can be performed by a wide range of optical communication devices currently deployed in optical networks.

As used herein, the terms "controller" and "logic" may be used to refer to one or more hardware components of an optical communication device, such as an optical transceiver. A 100G, 400G, or 800G optical transceiver module contains logic devices to handle the transmit and receive functions, control interfaces, and monitoring capabilities required by the corresponding optical interface specification. In some examples, one or more components of the controller and/or logic may be configured by firmware or other software. In various examples, the controller or logic of an optical transceiver may include one or more components performing various logical and/or processing functions of the optical communication device. A microcontroller or state machine logic may be used to govern the overall operation of the optical transceiver. The microcontroller or state machine may boot up on transceiver module power up, initialize internal components, and implement control loops for functions like transmit power regulation. One or more serializer/deserializer (SerDes) devices may be used to convert between high-speed serial data and parallel interfaces. A transmit SerDes may be used to serialize the input parallel data into a fast serial stream. A receive SerDes may be used to deserialize the incoming serial data into parallel words. A digital signal processor (DSP) may be used to provide flexibility in processing and/or conditioning the high-speed serial data signals. A DSP may provide advanced modulation, pre-emphasis, equalization, framing, and error checking capabilities. One or more analog-to-digital and/or digital-to-analog converters (ADC/DAC) may be used to enable monitoring and control of laser drivers, photodiode inputs, and/or other analog signals. Optical source driver circuitry of the optical transmitter 110 may be used to modulate the output of the optical source 106 (e.g., a tunable transmit laser) based on input serial data. Receiver circuitry may be used to amplify and digitize an incoming photodiode signal.

In view of the disclosure above, various examples are set forth below. It should be noted that one or more features of an example, taken in isolation or combination, should be considered within the disclosure of this application.

Examples described herein may thereby provide various techniques for independent channel control in coherent and non-coherent optical communication systems.

The following are example embodiments:

Example 1 is an optical communication device comprising: a first data interface providing a first channel; one or more additional data interfaces providing one or more additional channels; a multiplexer configured to generate a multiplexed signal encoding the first channel and the one or more additional channels; an optical transmitter configured to transmit the multiplexed signal over an optical link to a remote device; and a controller configured to: receive a disable signal identifying the first channel; and in response to receiving the disable signal: cause the optical transmitter to transmit a remote fault signal to the remote device on the first channel of the multiplexed signal; disable the first channel; cause the multiplexer to generate a modified multiplexed signal encoding the one or more additional channels and not the first channel; and cause the optical transmitter to transmit the modified multiplexed signal to the remote device over the optical link.

In Example 2, the subject matter of Example 1 includes, wherein: the multiplexer is configured to support a 100G, 400G, or 800G coherent optics interface; and the optical transmitter is a coherent optical transmitter comprising a coherent optical source.

In Example 3, the subject matter of Example 2 includes, wherein: the coherent optical source comprises a tunable laser configured to adjust a wavelength of the multiplexed signal.

In Example 4, the subject matter of Examples 1-3 includes, wherein: the remote fault signal is configured to be processed by the remote device without the remote device implementing a CMIS 5.2 standard.

In Example 5, the subject matter of Examples 1~4 includes, wherein: the controller is configured to maintain an optical source of the optical transmitter in an active state after the first channel is disabled.

In Example 6, the subject matter of Example 5 includes, wherein: the controller is configured to disable the optical source in response to determining that all additional channels have been disabled.

In Example 7, the subject matter of Examples 1-6 includes, wherein the disable signal is received from a network management system.

In Example 8, the subject matter of Examples 1-7 includes, wherein: the first data interface comprises a medium access control (MAC) associated with the first channel.

In Example 9, the subject matter of Examples 1-8 includes, wherein: the controller is configured to, in response to receiving the disable signal, cause the first data interface to generate the remote fault signal; the multiplexer is configured to receive the remote fault signal and to generate the multiplexed signal to incorporate the remote fault signal on the first channel of the multiplexed signal; the optical transmitter is configured to transmit the multiplexed signal, incorporating the remote fault signal, to the remote device on the first channel; the multiplexer is configured, in response to the disabling of the first channel, to generate the modified multiplexed signal encoding the one or more additional channels and not the first channel; and the optical transmitter is configured to transmit the modified multiplexed signal to the remote device over the optical link.

In Example 10, the subject matter of Example 9 includes, wherein: the controller causing the first data interface to generate the remote fault signal comprises: the controller causing the first data interface to simulate a local fault; and the first data interface generating the remote fault signal in response to the simulation of the local fault.

Example 11 is a method of independently controlling data channels of an optical multiplexed signal, comprising: at a first optical communication device: transmitting a multiplexed signal to a second optical communication device over an optical link, the multiplexed signal encoding a first channel provided by a first data interface and one or more additional channels provided by one or more additional data interfaces; and receiving a disable signal identifying a first channel; and in response to receiving the disable signal: causing the optical transmitter to transmit a remote fault signal to the second optical communication de vice on the first channel of the multiplexed signal; disabling the first channel; generating a modified multiplexed signal encoding the one or more additional channels and not the first channel; and transmitting the modified multiplexed signal to the second optical communication device over the optical link.

In Example 12, the subject matter of Example 11 includes, at the second optical communication device: in response to receiving the remote fault signal: disabling the first channel; and continuing to maintain the one or more additional channels.

In Example 13, the subject matter of Example 12 includes, wherein: the second optical communication device does not implement a CMIS 5.2 standard; and the second optical communication device processes the remote fault signal in accordance with a standard predating the CMIS 5.2 standard.

In Example 14, the subject matter of Examples 11-13 includes, wherein: the multiplexed signal and the modified multiplexed signal each comprise a 100G, 400G, or 800G optical multiplexed signal.

In Example 15, the subject matter of Examples 11-14 includes, maintaining an optical source of the first optical communication device in an active state after the first channel is disabled.

In Example 16, the subject matter of Example 15 includes, disabling the optical source in response to determining that all additional channels have been disabled.

In Example 17, the subject matter of Examples 11-16 includes, wherein: the first data interface comprises a medium access control (MAC) associated with the first channel.

Example 18 is an optical communication system comprising: a first optical communication device comprising: a multiplexer configured to generate a multiplexed signal encoding a first channel and one or more additional channels; an optical transmitter configured to transmit the multiplexed signal over an optical link to a second optical communication device; and a controller configured to: receive a disable signal identifying the first channel; and in response to receiving the disable signal: cause the optical transmitter to transmit a remote fault signal to the second optical communication device on the first channel of the multiplexed signal; disable the first channel; cause the multiplexer to generate a modified multiplexed signal encoding the one or more additional channels and not the first channel; and cause the optical transmitter to transmit the modified multiplexed signal to the remote device over the optical link.

In Example 19, the subject matter of Example 18 includes, the second optical communication device, wherein: the second optical communication device is configured to: in response to receiving the remote fault signal: disable the first channel; and continue to maintain the one or more additional channels.

In Example 20, the subject matter of Example 19 includes, wherein: the second optical communication device does not implement a CMIS 5.2 standard; and the second optical communication device processes the remote fault signal in accordance with a standard predating the CMIS 5.2 standard.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An optical communication device comprising:

a first data interface providing a first channel;

one or more additional data interfaces providing one or more additional channels;

a multiplexer configured to generate an optical multiplexed signal multiplexing the first channel and the one or more additional channels, wherein the optical multiplexed signal is a wavelength division multiplexed signal;

an optical transmitter configured to transmit the optical multiplexed signal over an optical link to a remote device; and a controller configured to:

receive a disable signal identifying the first channel; and in response to receiving the disable signal:

cause the optical transmitter to transmit a remote fault signal to the remote device on the first channel of the optical multiplexed signal;

disable the first channel;

cause the multiplexer to generate a modified optical multiplexed signal multiplexing the one or more additional channels and not the first channel; and cause the optical transmitter to transmit the modified optical multiplexed signal to the remote device over the optical link.

2. The optical communication device of claim 1, wherein:

the multiplexer is configured to support a 100G, 400G, or 800G coherent optics interface; and the optical transmitter is a coherent optical transmitter comprising a coherent optical source.

3. The optical communication device of claim 2, wherein:

the coherent optical source comprises a tunable laser configured to adjust a wavelength of the optical multiplexed signal.

4. The optical communication device of claim 1, wherein:

the remote fault signal is configured to be processed by the remote device without the remote device implementing a CMIS 5.2 standard.

5. The optical communication device of claim 1, wherein:

the controller is configured to maintain an optical source of the optical transmitter in an active state after the first channel is disabled.

6. The optical communication device of claim 5, wherein:

the controller is configured to disable the optical source in response to determining that all additional channels have been disabled.

7. The optical communication device of claim 1, wherein the disable signal is received from a network management system.

8. The optical communication device of claim 1, wherein:

the first data interface comprises a medium access control (MAC) associated with the first channel.

9. The optical communication device of claim 1, wherein:

the controller is configured to, in response to receiving the disable signal, cause the first data interface to generate the remote fault signal;

the multiplexer is configured to receive the remote fault signal and to generate the optical multiplexed signal to incorporate the remote fault signal on the first channel of the optical multiplexed signal;

the optical transmitter is configured to transmit the optical multiplexed signal, incorporating the remote fault signal, to the remote device on the first channel;

the multiplexer is configured, in response to the disabling of the first channel, to generate the modified optical multiplexed signal encoding the one or more additional channels and not the first channel; and the optical transmitter is configured to transmit the modified optical multiplexed signal to the remote device over the optical link.

10. The optical communication device of claim 9, wherein:

the controller causing the first data interface to generate the remote fault signal comprises:

the controller causing the first data interface to simulate a local fault; and the first data interface generating the remote fault signal in response to the simulation of the local fault.

11. A method of independently controlling data channels of an optical multiplexed signal, comprising:

at a first optical communication device:

transmitting the optical multiplexed signal to a second optical communication device over an optical link, the optical multiplexed signal multiplexing a first channel provided by a first data interface and one or more additional channels provided by one or more additional data interfaces, wherein the optical multiplexed signal is an optical wavelength division multiplexed signal;

receiving a disable signal identifying the first channel;

in response to receiving the disable signal:

causing an optical transmitter to transmit a remote fault signal to the second optical communication device on the first channel of the optical multiplexed signal;

disabling the first channel;

generating a modified optical multiplexed signal multiplexing the one or more additional channels and not the first channel; and transmitting the modified optical multiplexed signal to the second optical communication device over the optical link.

12. The method of claim 11, further comprising:

at the second optical communication device:

in response to receiving the remote fault signal:

disabling the first channel; and continuing to maintain the one or more additional channels.

13. The method of claim 12, wherein:

the second optical communication device does not implement a CMIS 5.2 standard; and the second optical communication device processes the remote fault signal in accordance with a standard predating the CMIS 5.2 standard.

14. The method of claim 11, wherein:

the optical multiplexed signal and the modified optical multiplexed signal each comprise a 100G, 400G, or 800G optical multiplexed signal.

15. The method of claim 11, further comprising:

maintaining an optical source of the first optical communication device in an active state after the first channel is disabled.

16. The method of claim 15, further comprising:

disabling the optical source in response to determining that all additional channels have been disabled.

17. The method of claim 11, wherein:

the first data interface comprises a medium access control (MAC) associated with the first channel.

18. An optical communication system comprising:

a first optical communication device comprising:

a multiplexer configured to generate an optical multiplexed signal multiplexing a first channel and one or more additional channels, wherein the optical multiplexed signal is a wavelength division multiplexed signal;

an optical transmitter configured to transmit the optical multiplexed signal over an optical link to a second optical communication device; and a controller configured to:

receive a disable signal identifying the first channel; and in response to receiving the disable signal:

cause the optical transmitter to transmit a remote fault signal to the second optical communication device on the first channel of the optical multiplexed signal;

disable the first channel;

cause the multiplexer to generate a modified optical multiplexed signal multiplexing the one or more additional channels and not the first channel; and cause the optical transmitter to transmit the modified optical multiplexed signal to the second optical communication device over the optical link.

19. The optical communication system of claim 18, further comprising the second optical communication device, wherein:

the second optical communication device is configured to:

in response to receiving the remote fault signal:

disable the first channel; and continue to maintain the one or more additional channels.

20. The optical communication system of claim 19, wherein:

the second optical communication device does not implement a CMIS 5.2 standard; and the second optical communication device processes the remote fault signal in accordance with a standard predating the CMIS 5.2 standard.

* * * * *